(12) United States Patent
Venkatathri et al.

(10) Patent No.: US 7,037,874 B2
(45) Date of Patent: May 2, 2006

(54) PROCESS FOR THE PREPARATION OF POROUS CRYSTALLINE SILICOALUMINOPHOSPHATE MOLECULAR SIEVES

(75) Inventors: Narayanan Venkatathri, Maharashtra (IN); Sooryakant G. Hegde, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 105 days.

(21) Appl. No.: 10/693,650

(22) Filed: Oct. 27, 2003

(65) Prior Publication Data

US 2005/0090390 A1    Apr. 28, 2005

(51) Int. Cl.
*B01J 29/06*    (2006.01)
(52) U.S. Cl. ............... 502/214; 502/208; 423/305; 423/306; 423/DIG. 30
(58) Field of Classification Search ............... 502/208, 502/214; 423/305, 306, DIG. 30
See application file for complete search history.

(56) References Cited

U.S. PATENT DOCUMENTS

| | | | | |
|---|---|---|---|---|
| 4,440,871 A | * | 4/1984 | Lok et al. | 502/214 |
| 4,898,722 A | * | 2/1990 | Derouane et al. | 423/701 |
| 6,238,550 B1 | * | 5/2001 | Strohmaier et al. | 208/111.01 |
| 2003/0100810 A1 | * | 5/2003 | Mertens et al. | 585/500 |

OTHER PUBLICATIONS

Venkatathri et al., "Synthesis of SAPO-35 in non-aqueous gels," J. Chem. Soc., Faraday Trans., 1997, 93 (18), pp. 3411-3415.*

* cited by examiner

*Primary Examiner*—Christina Johnson
(74) *Attorney, Agent, or Firm*—NIxon & Vanderhye P.C.

(57) ABSTRACT

The present invention relates to an improved process for the preparation of porous crystalline silicoaluminophosphate molecular sieves designated as SAPO-35. These molecular sieves are useful as catalysts in the transformation of hydrocarbons especially in the methanol to olefin reaction.

13 Claims, No Drawings

PROCESS FOR THE PREPARATION OF POROUS CRYSTALLINE SILICOALUMINOPHOSPHATE MOLECULAR SIEVES

FIELD OF THE INVENTION

The present invention relates to an improved process for the preparation of porous crystalline silicoaluminophosphate molecular sieves designated as SAPO-35. These molecular sieves are useful as catalysts in the transformation of hydrocarbons especially in the methanol to olefin reaction.

BACKGROUND OF THE INVENTION

Crystalline aluminosilicate zeolite type molecular sieve are well known in the art and are formed by corner sharing $SiO_2$ and $AlO_2$ tetrahedra and have pore openings of uniform dimensions, have a significant ion exchange capacity and are capable of reversibly desorbing an adsorbed phase which is dispersed throughout the internal voids of the crystal without displacing any atoms which make up the permanent crystal structure.

The most recently synthesized molecular sieves without silica are the crystalline aluminophosphate compositions disclosed in the U.S. Pat. No. 4,310,440 (1982). These materials are formed from $ALO_2$ and $PO_2$ tetrahedra and have electroneutral frameworks as in the case of silica polymorphs. Unlike the silica molecular sieve, silicalite, which is hydrophobic due to the absence of extra framework cations, aluminophosphate molecular sieves are moderately hydrophilic apparently due to the difference in the electronegativities of aluminium and phosphorous. Their intracrystalline pore volumes and pore diameter are comparable are comparable to those known for zeolites and silica molecular sieves.

A novel class of silicon—substituted aluminophosphate molecular sieve is disclosed in Lok et al., (U.S. Pat. No. 4,440,871) in 1984 which are both crystalline and microporous and exhibit properties which are characteristic of both aluminosilicate zeolite and the aluminophosphates. Members of this novel class of silicoaluminophosphate materials have three dimensional crystal framework structure of $PO_2+AlO_2-$ and $SiO_2$ tetrahedral units, and whose essential empirical chemical composition on an anhydrous basis is

$$MR:(Si_x Al_y P_z)O_2$$

wherein 'R' represents at least one organic templating agent present in the intracrystalline pore system, 'm' represents the moles of 'R' present per mole of $(Si_x Al_y P_z)O_2$ and has a value of from 0.1 to 0.3 and x, y, and z have a value from 0.1 to 0.20, 0.4 to 0.59 and 0.40 to 0.59 respectively.

Aluminophosphates are neutral in that they do not processes any acidity as the $(AlO_2)^-$ and $(PO_2)^+$ tetrahedra alternate in a regular fashion in the structure leading to a neutral framework. However, when $(SiO_2)$ tetrahedra are introduced in the lattice, they can replace a $(PO_2)^+$ tetrahedra leading to an anionic (negative) charge on the framework which when neutralized by a $H^+$ (proton) leads to an acid site just at the replacement of $Si^{4+}$ ions by $Al^{3+}$ and an $P^{5+}$ ions simultaneously replaced by two $Si^{4+}$ ions, no acidity is generated due to exact charge balancing.

It has been found that the method of preparation of the SAPO molecular sieve can influence the manner of incorporation of $Si^{4+}$ ions and the acidity of the material. It has been reported that the synthesis of SAPO-35 in a non-aqueous medium produces a more acidic material through preferential replacement of $P^{5+}$ ions by $Si^{5+}$ ions than when synthesis is carried out in an aqueous medium (Venkatathari and others in J. C. S. Faraday Transactions, volume 93, page 3411, year 1997).

The prior art procedure for the synthesis of SAPO-35 as disclosed in the U.S. Pat. No. 4,440,871 involves the reaction of aluminium isopropoxide or hydrated aluminum oxide with phosphoric acid and silica sol or fumed silica in the presence of organic templating compounds such as cyclohexyl amine and quinuclidine by autoclaving the reaction mixture directly at an elevated temperature of 150° C. to 200° C. for 24 h to 168 h.

The major disadvantages of the above prior art method for the synthesis of SAPO-35 is lower Bronsted acidity due to lower incorporation of Si in the framework besides producing less crystalline sample.

OBJECTS OF THE INVENTION

The main object of the present invention is to provide an improved process for the preparation of silicoaluminophosphate molecular sieve.

Another object is to provide a process for preparation of silicoaluminophosphate with higher crystalline samples.

SUMMARY OF THE INVENTION

Accordingly, the present invention provides an improved process for the preparation of a porous crystalline silicoaluminophosphate molecular sieve having a chemical composition in terms of the mole ratio of oxides given by the formula.

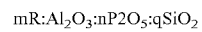
$$mR:Al_2O_3:nP_2O_5:qSiO_2$$

wherein R represents at least one organic templating agent present in the intracrystalline pore system; m represents mole of R present and has a value between 0.02 to 0.3, n has a value of from 0.96 to 1.1 and q has a value of from 0.1 to 1.0 characterized by the x-ray diffraction pattern given in Table I below

TABLE 1

X-ray diffraction pattern of the silicoaluminophosphate (SAPO-35)

| 2 θ | d-spacing | Relative intensity |
| --- | --- | --- |
| 8.60 | 10.27 | 13 |
| 10.92 | 8.10 | 34 |
| 13.32 | 6.64 | 31 |
| 17.30 | 5.12 | 64 |
| 21.00 | 4.23 | 40 |
| 21.90 | 4.06 | 100 |
| 23.22 | 3.83 | 26 |
| 24.98 | 3.56 | 11 |
| 26.88 | 3.31 | 29 |
| 28.50 | 3.13 | 49 |
| 29.12 | 3.06 | 16 |
| 31.66 | 2.82 | 8 |
| 32.16 | 2.78 | 71 |
| 34.52 | 2.60 | 12 |
| 42.06 | 2.15 | 8 |
| 42.84 | 2.11 | 8 |
| 42.98 | 2.10 | 8 | which comprises mixing a aluminum source, a silicon source, and phosphorous oxide and an organic template in a non-aqueous medium, heating the mixture, cooling the reaction mixture rapidly to room temperature and separating the crystalline material, washing with distilled water and drying the crystalline material, calcining the crystalline material to remove the organic material occluded in its pore to get porous crystalline silicoanluminophosphate molecular sieve.

In an embodiment of the present invention the silicon source is selected from the group consisting of fumed silica and tetramethylorthosilicate.

In an another embodiment of the present invention the aluminium source is aluminum alkoxide, preferable aluminum isopropoxide.

In yet another embodiment of the invention, the source of phosphorous oxide is orthophosporic acid.

In yet an another embodiment of the present invention the organic template is hexamethyleneimine.

In another embodiment of the invention, the heating of the mixture at autogeneous conditions is carried out at a temperature in the range of 190–210° C. for a period of about 15 days.

In yet another embodiment of the invention, the washed crystalline material is dried at a temperature in the range of 100–120° C.

In yet another embodiment of the invention, the calcination of the crystalline material is carried out at a temperature in the range of 500–600° C.

DETAILED DESCRIPTION OF THE INVENTION

The present invention provides an improved process for the preparation of a porous crystalline silicoaluminophosphate molecular sieve having a chemical composition in terms of the mole ratio of oxides given by the formula.

$mR:Al_2O_3:nP2O_5:qSiO_2$

In the above formula, R R represents at least one organic templating agent present in the intracrystalline pore system; m represents mole of R present and has a value between 0.02 to 0.3, n has a value of from 0.96 to 1.1 and q has a value of from 0.1 to 1.0. The molecular sieve is characterized by the x-ray diffraction pattern given in Table I below

TABLE 1

X-ray diffraction pattern of the silicoaluminophosphate (SAPO-35)

| 2 θ | d-spacing | Relative intensity |
|---|---|---|
| 8.60 | 10.27 | 13 |
| 10.92 | 8.10 | 34 |
| 13.32 | 6.64 | 31 |
| 17.30 | 5.12 | 64 |
| 21.00 | 4.23 | 40 |
| 21.90 | 4.06 | 100 |
| 23.22 | 3.83 | 26 |
| 24.98 | 3.56 | 11 |
| 26.88 | 3.31 | 29 |
| 28.50 | 3.13 | 49 |
| 29.12 | 3.06 | 16 |
| 31.66 | 2.82 | 8 |
| 32.16 | 2.78 | 71 |
| 34.52 | 2.60 | 12 |
| 42.06 | 2.15 | 8 |
| 42.84 | 2.11 | 8 |
| 42.98 | 2.10 | 8 |

The method of the invention comprises mixing an aluminum source, a silicon source, and phosphorous oxide and an organic template in a non-aqueous medium. The mixture is then heated followed by rapid cooling to room temperature. The crystalline material obtained is then separated and washed with distilled water and then dried. The dried crystalline material is then calcined to remove the organic material occluded in its pore to get porous crystalline silicoanluminophosphate molecular sieve.

The silicon source is preferably selected from the group consisting of fumed silica and tetramethylorthosilicate, the aluminium source is an aluminum alkoxide, preferable aluminum isopropoxide and the source of phosphorous oxide is orthophosporic acid. The organic template is hexamethyleneimine.

The heating of the mixture at autogeneous conditions is carried out at a temperature in the range of 190–210° C. for a period of about 15 days. The washed crystalline material is dried at a temperature in the range of 100–120° C. The calcination of the crystalline material is carried out at a temperature in the range of 500–600° C.

In a feature of the present invention the silica aluminophosphate of the present invention exhibits a larger acidity and greater catalytic activity. The acidity of the catalyst is usually determined by comparing the amount of an adsorbed basic compound such as ammonia retained by it even after heating to an elevated temperature. The silicoaluminophosphate of type 35 (SAPO-35) synthesized by the process of the present invention possessed a larger acidity than the material synthesized by the prior art method of U.S. Pat. No. 4,440,871.

The SAPO-35 silicoaluminophosphate synthesized by the process of the present invention possesses a crystalline structure, the X-ray powder diffraction pattern of the assynthesized form showing the characteristic peaks listed in Table 1 above.

The improved process of this invention will now be illustrated by examples, which are not to be construed as limiting the invention in any manner.

EXAMPLE 1

This example illustrates the improved process of the present invention for preparing SAPO-35 by changing the medium in to non-aqueous. 6.05 g of aluminum isopropoxide grind well and mixed with 45.50 g of ethylene glycol. 7.27 g of hexamethyleneimine was added to above mixture 0.526 g of fumed silica was added to the slowly and stirred well. To this mixture 6.024 g of orthophosphoric acid was added and kept for stirring to 8 h at room temperature. The final active gel ($Al_2O_3$:1.8$P_2O_5$:03$SiO_2$:4.5 HEM:45EG) was charged into a Teflon lined steel autoclave. Crystallization carried out at 200° C. for 15 days. Then the autoclave was immediately cooled and the product was washed with water, dried overnight at 100° C. and calcined in air for 8 h at 550° C. The chemical composition of the solid material in terms of the mole ratio of oxides was found to be $Al_2O_3$:0.85$P2O_5$:0.28 $SiO_2$

EXAMPLE 2

The example illustrates the improved process of the present invention for preparing SAPO-35 similar to that described in Example 1 but with a higher silica content. 6.05 g of finely powered aluminum isopropoxide was mixed with 45.50 g of ethyleneglycol. 7.27 g of hexamethyleneinmine was added to the mixture and form a clear gel. 1.052 g of fumed silica was added to the above gel. 6.024 g of orthophosphoric acid was added slowly to the gel and stirred well for 8 h at room temperature. The final active gel ($Al_2O_3$:1.8$P_2O_5$:$O_6SiO_2$:45 HEMG) was charged into a teflon lined steel autoclave. Crystallization was carried out for 15 days at 200° C. The autoclave was then immediately cooled and product was filtered washed with water dried overnight at 110° C. and calcined in air for 8 h at 550° C. The chemical composition of the solid material in terms of the mole ratio of oxides was found to be:

$Al_2O_3:0.7P_2O_5:0.56SiO_2$

EXAMPLE 3

This example illustrates the improved process of the present invention for preparing SAPO-35 similar to that described in Example 1 but with more silicon content. 6.05 g of finely powdered aluminum isopropoxide was mixed with 45.50 g of ethylene glycol. 27 g of hexamethyleneimine was added. The mixture stirred well. 1578 g filmed silica added to the mixture. Finally 6.024 of orthophosphoric acid was added drop by drop. The gel was stirred for 8 h at room temperature. The active gel with molar composition of $Al_2O_3:1.8P_2O_5:0.9SiO_2:4.5$ HEM:45EG was charged into a Teflon lined steel autoclave. Crystallization was carried out at 200° C. for 15 days. Then the autoclave was immediately cooled and the product was filtered washed with water dried overnight at 110° C. and calcined in air for 8 h at 500° C. Chemical composition of the solid material in terms of the mole ratio of oxides was found to be:

$Al_2O_3:065P_2O_5:0.85 SiO_2$

EXAMPLE 4

This example illustrates the improved process of the present invention for preparing SAPO-35 similar to that described in Example 1 but with addition of water. 6.05 g of finely powdered aluminum isopropoxide was mixed and stirred well. 0.526 g of fumed silica was added. Then 13.06 g of distilled water is added. Further 6.024 g of orthophosporic acid was added. The final ge. $(Al_2O_3:1.8P_2O_5:0.3SiO_2:4.5EHM:45H_2O:45EG)$ stirred well for eight hours at room temperature and charged into a Teflon lines steel autoclave. Crystallization was carried out for 15 days at 200° C. The autoclave was then immediately cooled and product was filtered washed with water, dried overnight at 110° C. and calcined in air for 8 h at 550° C. The chemical composition of the solid material in terms of the mole ratio of the oxides was found to be:

$Al_2O_3:0.72P_2O_5:0.28SiO_2$

EXAMPLE 5

The example compares the methanol to olefin catalytic activity of SAPO-35 and ZSM-5 molecular sieves. Methanol conversion to hydrocarbon was carried out at different temperatures in a tubular glass reactor using 2.0 g of the catalyst after pelletizing and sieving to 10–20 mesh size. Both SAPO-35 and ZSM-5 were active but SAPO-35 is more selective catalyst (Table 2) was found.

TABLE 2

Methanol to olefin transformation

| Sample | $C_3$ | $C_4$ | $C_5+$ Aliphatics | $C_6$–$C_8$ aromatics | $C_8$ Aromatics |
|---|---|---|---|---|---|
| SAPO-35 | 0.12 | 0.04 | 99.82 | 0.01 | — | — |
| ASM-5 | 15.86 | 37.70 | 11.74 | 20.70 | 4.43 | 7.00 |

Conversion=100%

Conditions: WHSV $(h^{-1})$=6.0, $N_2$/methanol (mole)=1.5, TOS=1, Catalyst=2 g, Temperature: 673 K.

We claim:

1. A process for the preparation of a porous crystalline silicoaluminophosphate molecular sieve having a chemical composition in terms of the mole ratio of oxides given by the formula $mR:Al_2O_3:nP_2O_5:qSiO_2$ wherein R represents at least one organic templating agent present in the intracrystalline pore system, m represents mole of R present and has a value between 0.02 to 0.3, n has a value of from 0.96 to 1.1, and q has a value of from 0.1 to 1.0 characterized by the x-ray diffraction pattern given in Table I below

TABLE 1

X-ray diffraction pattern of the silicoaluminophosphate (SAPO-35)

| 2 θ | d-spacing | Relative intensity |
|---|---|---|
| 8.60 | 10.27 | 13 |
| 10.92 | 8.10 | 34 |
| 13.32 | 6.64 | 31 |
| 17.30 | 5.12 | 64 |
| 21.00 | 4.23 | 40 |
| 21.90 | 4.06 | 100 |
| 23.22 | 3.83 | 26 |
| 24.98 | 3.56 | 11 |
| 26.88 | 3.31 | 29 |
| 28.50 | 3.13 | 49 |
| 29.12 | 3.06 | 16 |
| 31.66 | 2.82 | 8 |
| 32.16 | 2.78 | 71 |
| 34.52 | 2.60 | 12 |
| 42.06 | 2.15 | 8 |
| 42.84 | 2.11 | 8 |
| 42.98 | 2.10 | 8 | which comprises mixing a aluminum source, a silicon source, and phosphorous oxide and an organic template in a non-aqueous medium, heating and crystallizing the mixture in an autoclave, cooling the autoclave containing the reaction mixture to room temperature and separating the crystalline material, then washing with distilled water and drying the crystalline material, calcining the crystalline material to remove the organic material occluded in its pore to get porous crystalline silicoaluminophosphate molecular sieve.

2. A process as claimed in claim 1 wherein the silicon source is selected from the group consisting of silica sol, fumed silica, tetramethylorthosilicate, silicic acid and any mixture thereof.

3. A process as claimed in claim 1 wherein the aluminium source is an aluminum alkoxide.

4. A process as claimed in claim 3 wherein the aluminium alkoxide is aluminum isopropoxide.

5. A process as claimed in claim 1 wherein the source of phosphorous oxide is orthophosporic acid.

6. A process as claimed in claim 1 wherein the organic template is hexamethyleneimine.

7. A process as claimed in claim 1 wherein the heating of the mixture is carried out at autogenous conditions, wherein the temperature is in the range of 190–210° C. for a period of about 15 days.

8. A process as claimed in claim 1 wherein the washed crystalline material is dried at a temperature in the range of 100–120° C.

9. A process as claimed in claim 1 wherein the calcination of the crystalline material is carried out at a temperature in the range of 500–600° C.

10. A process as claimed in claim 9 wherein the calcination occurs for eight hours.

11. A process as claimed in claim 1 wherein the selectivity of the porous crystalline silicoaluminophosphate molecular sieve is in the range of 90 to 100%.

12. A process for the preparation of a porous crystalline silicoaluminophosphate molecular sieve having a chemical composition in terms of the mole ration of oxides given by the formula $mR:Al_2O_3:nP_2O_5:qSiO_2$ wherein R represents at least one organic templating agent present in the intracrystalline pore sytem; m represents mole of R present and has a value between 0.02 to 0.3, n has a value of from 0.96 to 1.1 and q has a value of from 0.1 to 1.0, the molecular sieve having the X-ray diffraction pattern in Table 1 below, the process comprising mixing a source of aluminum, a source of silicon, and a source of phosphorous oxide and an organic temple in a non-aqueous medium, heating the said mixture under autogeneous conditions at 190–210° C. for about 15 days in an autoclave, cooling the autoclave containing the reaction mixture to room temperature, separating the crystalline material and then washing with distilled water and drying the crystalline material, calcining the crystalline material at 500–600° C. to remove the organic material occluded in its pore to get porous crystalline silicoaluminophosphate molecular sieve.

13. A process as claimed in claim 12 wherein the calcining occurs for eight hours.

* * * * *